United States Patent
Kita

(10) Patent No.: US 12,531,791 B2
(45) Date of Patent: Jan. 20, 2026

(54) VALIDATION SYSTEM AND VALIDATION METHOD

(71) Applicant: RAKUTEN MOBILE, INC., Tokyo (JP)

(72) Inventor: Shinya Kita, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/567,362

(22) PCT Filed: Feb. 17, 2022

(86) PCT No.: PCT/JP2022/006487
§ 371 (c)(1),
(2) Date: Dec. 6, 2023

(87) PCT Pub. No.: WO2023/157199
PCT Pub. Date: Aug. 24, 2023

(65) Prior Publication Data
US 2024/0275694 A1  Aug. 15, 2024

(51) Int. Cl.
*H04L 41/40* (2022.01)
*H04L 41/142* (2022.01)
*H04L 41/147* (2022.01)

(52) U.S. Cl.
CPC ............ *H04L 41/40* (2022.05); *H04L 41/142* (2013.01); *H04L 41/147* (2013.01)

(58) Field of Classification Search
CPC .. H04L 41/142; H04L 41/147; H04L 41/0823
See application file for complete search history.

(56) References Cited

U.S. PATENT DOCUMENTS

| | | | |
|---|---|---|---|
| 10,338,994 B1* | 7/2019 | Xie | G06F 11/0727 |
| 2019/0052528 A1 | 2/2019 | Yoshimura et al. | |
| 2022/0232579 A1* | 7/2022 | Lee | H04L 67/30 |
| 2022/0278889 A1* | 9/2022 | Malleshaiah | H04L 67/51 |
| 2023/0043262 A1* | 2/2023 | Jung | H04W 16/18 |
| 2023/0156522 A1* | 5/2023 | Bashir | H04W 28/088 |
| | | | 370/329 |

FOREIGN PATENT DOCUMENTS

| | | |
|---|---|---|
| JP | 2017173894 A | 9/2017 |
| WO | 2017170470 A1 | 10/2017 |

* cited by examiner

*Primary Examiner* — Tonia L Dollinger
*Assistant Examiner* — Joseph M Cousins
(74) *Attorney, Agent, or Firm* — HAUPTMAN HAM, LLP

(57) ABSTRACT

A container management module or a configuration management module changes a state of a network service for providing a communication service. An AI/big-data processing module calculates an index value indicating a use status of the communication service dependent on the state of the network service in a status before the change of the state at present or at a future time based on: an actual result value of a use status of the communication service independent of the state of the network service at a timing after the change of the state; and the state of the network service before the change of the state. A policy manager module determines whether the calculated index value satisfies a predetermined condition.

17 Claims, 13 Drawing Sheets

FIG.7

| TIME STAMP DATA | TOTAL THROUGHPUT DATA | TOTAL NUMBER-OF -USER DATA |
|---|---|---|
| 2021/12/1 8:30:00 | x1 (100) | x2 (100) |
| 2021/12/1 8:45:00 | x1 (101) | x2 (101) |
| 2021/12/1 9:00:00 | x1 (102) | x2 (102) |
| 2021/12/1 9:15:00 | x1 (103) | x2 (103) |
| 2021/12/1 9:30:00 | x1 (104) | x2 (104) |
| 2021/12/1 9:45:00 | x1 (105) | x2 (105) |
| 2021/12/1 10:00:00 | x1 (106) | x2 (106) |

FIG.10

| REFERENCE DATE-AND-TIME DATA | 2021/12/1 9:00:00 |
|---|---|

| NUMBER-OF-UPF DATA | 3 |
|---|---|

| PREDICTION TARGET DATE-AND-TIME DATA | AVERAGE THROUGHPUT PREDICTION RESULT DATA |
|---|---|
| 2021/12/1 9:15:00 | y1_3(103) |
| 2021/12/1 9:30:00 | y2_3(104) |
| 2021/12/1 9:45:00 | y3_3(105) |

FIG.11

| REFERENCE DATE -AND-TIME DATA | 2021/12/1 10:00:00 |
|---|---|

| NUMBER-OF-UPF DATA | 4 |
|---|---|

| PREDICTION TARGET DATE -AND-TIME DATA | AVERAGE THROUGHPUT PREDICTION RESULT DATA |
|---|---|
| 2021/12/1 10:15:00 | y1_4(107) |
| 2021/12/1 10:30:00 | y2_4(108) |
| 2021/12/1 10:45:00 | y3_4(109) |

FIG.12

| REFERENCE DATE -AND-TIME DATA | 2021/12/1 10:00:00 |
|---|---|

| NUMBER-OF-UPF DATA | 3 |
|---|---|

| PREDICTION TARGET DATE -AND-TIME DATA | AVERAGE THROUGHPUT PREDICTION RESULT DATA |
|---|---|
| 2021/12/1 10:15:00 | y1_3(107) |
| 2021/12/1 10:30:00 | y2_3(108) |
| 2021/12/1 10:45:00 | y3_3(109) |

VALIDATION SYSTEM AND VALIDATION METHOD

RELATED APPLICATIONS

The present application is a National Phase of International Application Number PCT/JP2022/006487, filed Feb. 17, 2022.

TECHNICAL FIELD

The present invention relates to a validation system and a validation method.

BACKGROUND ART

In Patent Literature 1 and Patent Literature 2, there are described technologies for executing scale-out of service providing means for providing a communication service, such as a virtualized network function (VNF).

CITATION LIST

Patent Literature

[Patent Literature 1] JP 2017-173894 A
[Patent Literature 2] WO 2017/170470 A1

SUMMARY OF INVENTION

Technical Problem

With the technologies as described in Patent Literature 1 and Patent Literature 2, it is not possible to accurately perform a validation of a change of a state of service providing means, such as a validation of execution of scale-out.

The present invention has been made in view of the above-mentioned circumstances, and has an object to provide a validation system and a validation method which are capable of accurately performing a validation of a change of a state of service providing means.

Solution to Problem

In order to solve the above-mentioned problem, according to one embodiment of the present invention, there is provided a validation system including: changing means for changing a state of service providing means for providing a communication service; calculation means for calculating an index value indicating a use status of the communication service dependent on the state of the service providing means in a status before the change of the state at present or at a future time based on: an actual result value of a use status of the communication service independent of the state of the service providing means at a timing after the change of the state; and the state of the service providing means before the change of the state; and determination means for determining whether the calculated index value satisfies a predetermined condition.

In one aspect of the present invention, the actual result value of the use status of the communication service independent of the state of the service providing means is an actual result value indicating a total processing load amount required to be processed by the service providing means.

In this aspect, the actual result value of the use status of the communication service independent of the state of the service providing means may be an actual result value of at least one of a total throughput of the communication service or the total number of users of the communication service.

Further, in one aspect of the present invention, the index value indicating the use status of the communication service dependent on the state of the service providing means is a performance index value indicating quality of service of the communication service.

In this aspect, the index value indicating the use status of the communication service dependent on the state of the service providing means may be an average throughput per user equipment (UE) in an area covered by the communication service.

Further, in one aspect of the present invention, the determination means is configured to determine whether a combination of the calculated index value and the actual result value of the use status of the communication service indicated by the index value satisfies a predetermined condition.

Further, in one aspect of the present invention, the changing means is configured to execute scale-out of the service providing means, and the calculation means is configured to calculate the index value indicating the use status of the communication service dependent on a scale of the service providing means in a status before the execution of the scale-out at present or at a future time based on: the actual result value of the use status of the communication service independent of the scale of the service providing means at a timing after at least partial completion of the scale-out; and the scale of the service providing means before start of the scale-out.

In this aspect, the changing means may be configured to execute the scale-out of a user plane function (UPF) included in the service providing means, and the scale of the service providing means may be the number of UPFs included in the service providing means.

Further, in one aspect of the present invention, the validation system further includes output means for outputting a result of the determination.

Further, according to one embodiment of the present invention, there is provided a validation method including the steps of: changing a state of service providing means for providing a communication service; calculating an index value indicating a use status of the communication service dependent on the state of the service providing means in a status before the change of the state at present or at a future time based on: an actual result value of a use status of the communication service independent of the state of the service providing means at a timing after the change of the state; and the state of the service providing means before the change of the state; and determining whether the calculated index value satisfies a predetermined condition.

BRIEF DESCRIPTION OF DRAWINGS

FIG. 7 is a table for showing an example of total processing load amount data in time series.

FIG. 10 is a diagram for illustrating an example of prediction result data.

FIG. 11 is a diagram for illustrating an example of the prediction result data.

FIG. 12 is a diagram for illustrating an example of the prediction result data.

DESCRIPTION OF EMBODIMENTS

One embodiment of the present invention is now described in detail with reference to the drawings.

Figure 1:
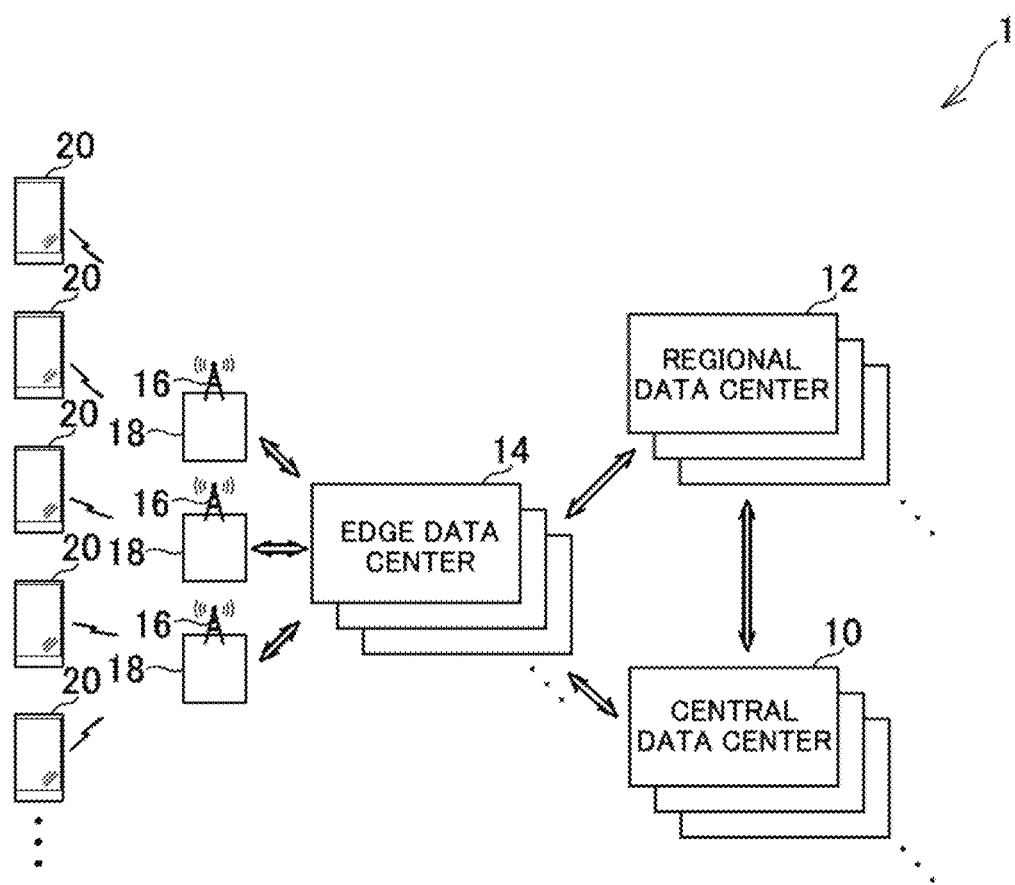
FIG. 1 is a diagram for illustrating an example of a communication system in one embodiment of the present invention.
Figure 2:
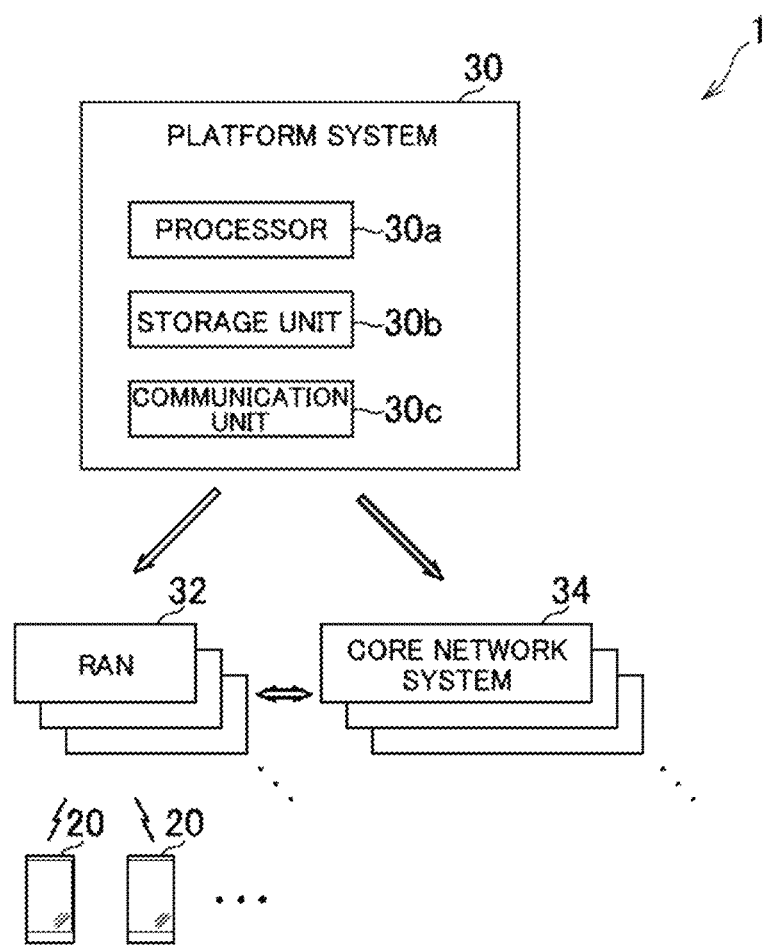
FIG. 2 is a diagram for illustrating an example of the communication system in the one embodiment of the present invention.

FIG. 1 and FIG. 2 are each a diagram for illustrating an example of a communication system 1 in the one embodiment of the present invention. FIG. 1 is an illustration drawn with attention being given to locations of a data center group included in the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central data centers 10 are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate to/from a communication facility 18 provided with an antenna 16. In this case, as illustrated in FIG. 1, one edge data center 14 may be capable of communicating to/from several communication facilities 18. The communication facility 18 may include a computer such as a server computer. The communication facility 18 in this embodiment performs radio communication to/from a user equipment (UE) 20 via the antenna 16. The communication facility 18 provided with the antenna 16 is provided with, for example, a radio unit (RU), which is described later.

A plurality of servers are arranged in each of the central data centers 10, the regional data centers 12, and the edge data centers 14 in this embodiment.

In this embodiment, for example, the central data centers 10, the regional data centers 12, and the edge data centers 14 can communicate to/from one another. Communication can also be performed between the central data centers 10, between the regional data centers 12, and between the edge data centers 14.

As illustrated in FIG. 2, the communication system 1 in this embodiment includes a platform system 30, a plurality of radio access networks (RANs) 32, a plurality of core network systems 34, and a plurality of UEs 20. The core network system 34, the RAN 32, and the UE 20 cooperate with each other to implement a mobile communication network.

The RAN 32 is a computer system, which is provided with the antenna 16, and corresponds to an eNodeB (eNB) in a fourth generation mobile communication system (hereinafter referred to as "4G") and an NR base station (gNB) in a fifth generation mobile communication system (hereinafter referred to as "5G"). The RANs 32 in this embodiment are implemented mainly by server groups arranged in the edge data centers 14 and the communication facilities 18. A part of the RAN 32 (for example, virtual distributed unit (vDU) or virtual central unit (vCU) in 4G or distributed unit (DU) or central unit (CU) in 5G) may be implemented by the central data center 10 or the regional data center 12 instead of the edge data center 14.

The core network system 34 is a system corresponding to an evolved packet core (EPC) in 4G or a 5G core (5GC) in 5G. The core network systems 34 in this embodiment are implemented mainly by server groups arranged in the central data centers 10 or the regional data centers 12.

The platform system 30 in this embodiment is configured, for example, on a cloud platform and includes a processor 30a, a storage unit 30b, and a communication unit 30c, as illustrated in FIG. 2. The processor 30a is a program control device such as a microprocessor which operates in accordance with a program installed in the platform system 30. The storage unit 30b is, for example, a storage element such as a ROM or RAM, a solid state drive (SSD), a hard disk drive (HDD), or the like. The storage unit 30b stores a program to be executed by the processor 30a, and the like. The communication unit 30c is, for example, a communication interface such as an NIC or a wireless LAN module. Software-defined networking (SDN) may be implemented in the communication unit 30c. The communication unit 30c exchanges data with the RAN 32 and the core network system 34.

In this embodiment, the platform system 30 is implemented by a server group arranged in the central data center 10. The platform system 30 may be implemented by a server group arranged in the regional data center 12.

In this embodiment, for example, in response to a purchase request for a network service (NS) by a purchaser, the network service for which the purchase request has been made is constructed in the RAN 32 or the core network system 34. Then, the constructed network service is provided to the purchaser.

For example, a network service such as a voice communication service, a data communication service, or the like is provided to the purchaser who is a mobile virtual network operator (MVNO). The voice communication service or the data communication service provided in this embodiment is eventually provided to a customer (end user) for the purchaser (MVNO in the above-mentioned example), who uses the UE 20 illustrated in FIG. 1 and FIG. 2. The end user can perform voice communication or data communication to/from other users via the RAN 32 or the core network system 34. The UE 20 of the end user can also access a data network such as the Internet via the RAN 32 or the core network system 34.

In addition, in this embodiment, an IoT service may be provided to an end user who uses a robot arm, a connected car, or the like. In this case, an end user who uses, for example, a robot arm, a connected car, or the like may be a purchaser of the network service in this embodiment.

In this embodiment, a container-type application execution environment such as Docker is installed in the servers arranged in the central data center 10, the regional data center 12, and the edge data center 14, and containers can be deployed in those servers and operated. On those servers, a cluster (Kubernetes cluster) managed by a container management tool such as Kubernetes may be constructed. Then, a processor on the constructed cluster may execute a container-type application.

The network service provided to the purchaser in this embodiment is formed of one or a plurality of functional units (for example, network function (NF)). In this embodiment, the functional unit is implemented by a containerized network function (CNF) being a container-based functional unit. The functional unit in this embodiment may also correspond to a network node.

Figure 3:
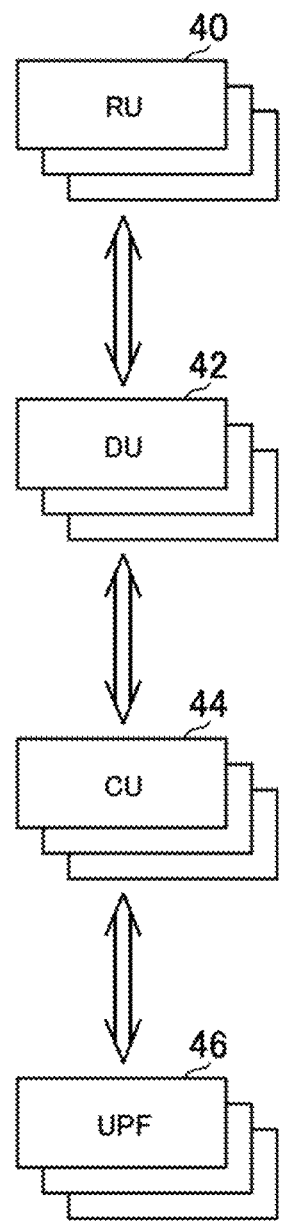
FIG. 3 is a diagram for schematically illustrating an example of a network service in the one embodiment of the present invention.

FIG. 3 is a diagram for schematically illustrating an example of an operating network service corresponding to an example of "service providing means for providing a communication service" described in the appended claims. The network service illustrated in FIG. 3 is a subsystem of the communication system 1.

The network service illustrated in FIG. 3 includes NFs, such as a plurality of RUs 40, a plurality of DUs 42, a plurality of CUs 44, and a plurality of user plane functions (UPFs) 46, as software elements. The network service also includes other software elements, such as access and mobility management functions (AMFs) and session management functions (SMFs), but description of those elements is omitted. In addition, the network service is implemented on a plurality of servers or other computer resources (hardware elements).

In this embodiment, for example, the network service illustrated in FIG. 3 provides a communication service in a certain area.

In this embodiment, it is also assumed that the plurality of RUs 40, the plurality of DUs 42, the plurality of CUs 44, and the plurality of UPFs 46, which are illustrated in FIG. 3, belong to one end-to-end network slice.

Figure 4:
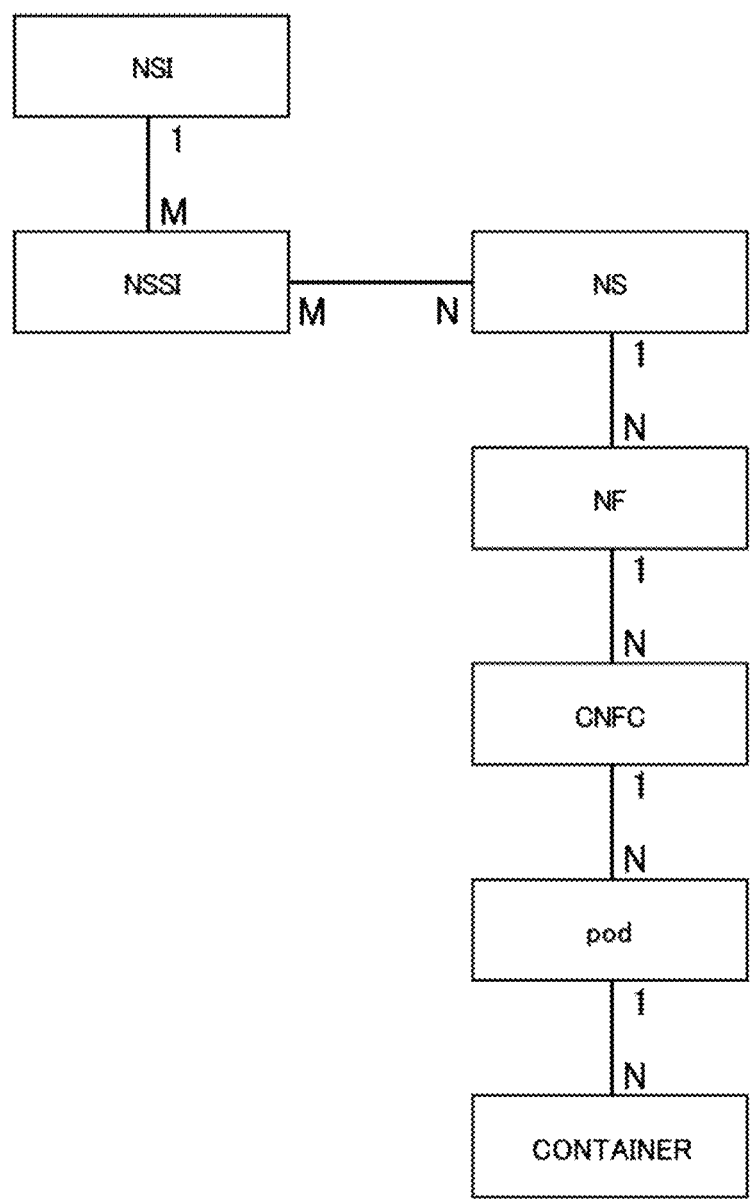
FIG. 4 is a diagram for illustrating an example of links between elements constructed in the communication system in the one embodiment of the present invention.

FIG. 4 is a diagram for schematically illustrating an example of links between elements constructed in the communication system 1 in this embodiment.

As illustrated in FIG. 4, a network service (NS), a network function (NF), a containerized network function component (CNFC), a pod, and a container have a hierarchical structure.

The NS corresponds to, for example, a network service formed of a plurality of NFs as illustrated in FIG. 3. In this case, the NS may correspond to an element having a granularity, such as a 5GC, an EPC, a 5G RAN (gNB), or a 4G RAN (eNB).

In 5G, the NF corresponds to an element having a granularity, such as the DU 42, the CU 44, or the UPF 46. The NF also corresponds to an element having a granularity, such as an AMF or an SMF. In 4G, the NF corresponds to an element having a granularity, such as a mobility management entity (MME), a home subscriber server (HSS), a serving gateway (S-GW), a vDU, or a vCU. In this embodiment, for example, one NS includes one or a plurality of NFs. That is, one or a plurality of NFs are under the control of one NS.

The CNFC corresponds to an element having a granularity, such as DU mgmt or DU processing. The CNFC may be a microservice deployed on a server as one or more containers. For example, some CNFCs may be microservices that provide a part of the functions of the DU 42, the CU 44, and the like. Some CNFCs may be microservices that provide a part of the functions of the UPF 46, the AMF, the SMF, and the like. In this embodiment, for example, one NF includes one or a plurality of CNFCs. That is, one or a plurality of CNFCs are under the control of one NF.

The pod refers to, for example, the minimum unit for managing a Docker container by Kubernetes. In this embodiment, for example, one CNFC includes one or a plurality of pods. That is, one or a plurality of pods are under the control of one CNFC.

In this embodiment, for example, one pod includes one or a plurality of containers. That is, one or a plurality of containers are under the control of one pod.

In addition, as illustrated in FIG. 4, a network slice (NSl) and a network slice subnet instance (NSSI) have a hierarchical structure.

The NSIs can be said to be end-to-end virtual circuits that span a plurality of domains (for example, from the RAN 32 to the core network system 34). Each NSI may be a slice for high-speed and high-capacity communication (for example, eMBB), a slice for high-reliability and low-latency communication (for example, URLLC), or a slice for connecting a large quantity of terminals (for example, mMTC). The NSSIs can be said to be single domain virtual circuits dividing an NSI. Each NSSI may be a slice of a RAN domain, a slice of a mobile back haul (MBH) domain, or a slice of a core network domain.

In this embodiment, for example, one NSI includes one or a plurality of NSSIs. That is, one or a plurality of NSSIs are under the control of one NSI. In this embodiment, a plurality of NSIs may share the same NSSI.

In addition, as illustrated in FIG. 4, the NSSI and the NS generally have a many-to-many relationship.

In addition, in this embodiment, for example, one NF can belong to one or a plurality of network slices. Specifically, for example, network slice selection assistance information (NSSAI) including one or a plurality of pieces of sub-network slice selection assist information (S-NSSAI) can be set for one NF. In this case, the S-NSSAI is information associated with the network slice. The NF is not required to belong to the network slice.

Figure 5:
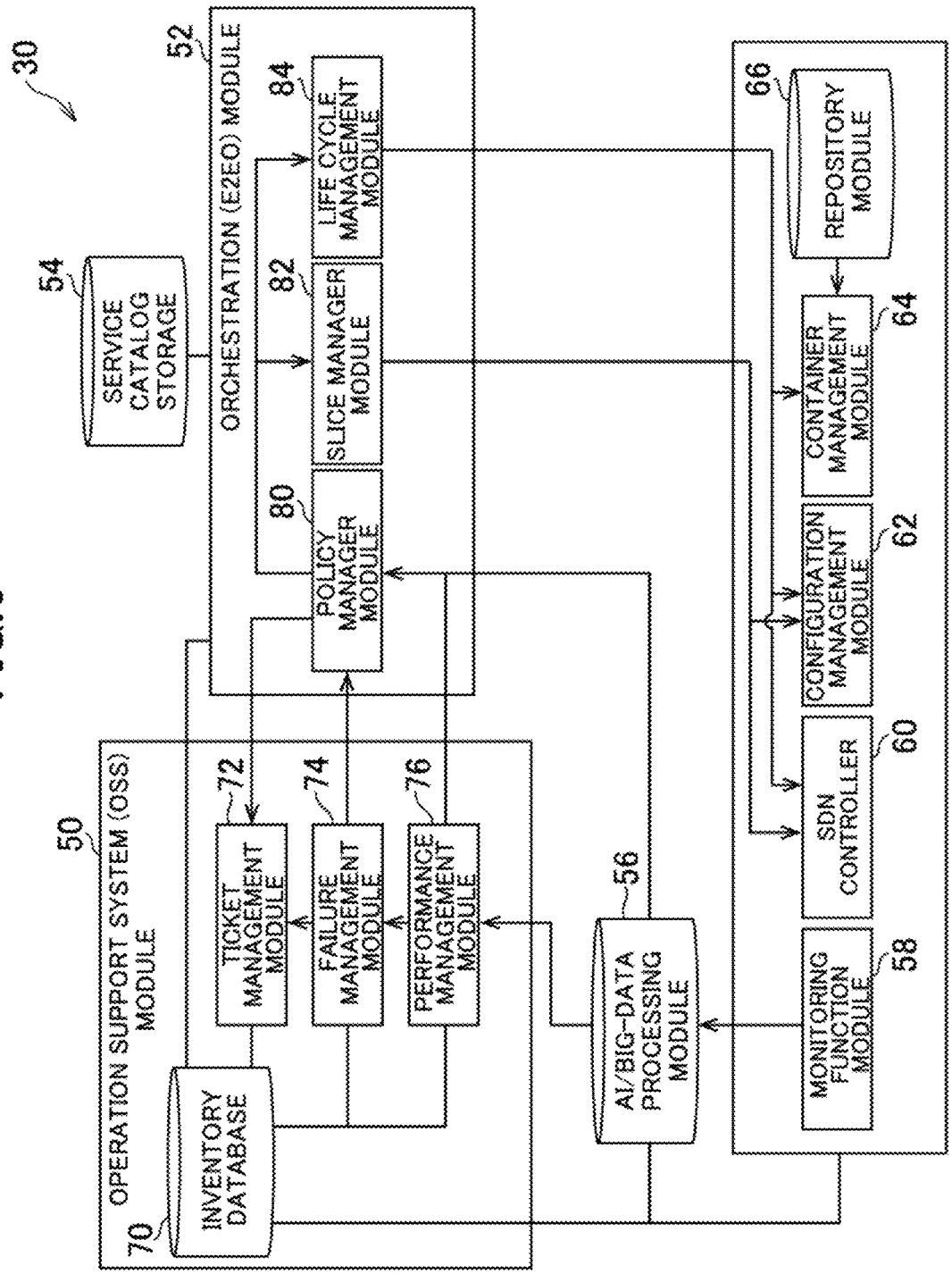
FIG. 5 is a functional block diagram for illustrating an example of functions implemented by a platform system in the one embodiment of the present invention.

FIG. 5 is a functional block diagram for illustrating an example of functions implemented by the platform system 30 in this embodiment. The platform system 30 in this embodiment is not required to implement all the functions illustrated in FIG. 5, and may implement functions other than those illustrated in FIG. 5.

As illustrated in FIG. 5, the platform system 30 in this embodiment functionally includes, for example, an operation support system (OSS) module 50, an orchestration (end-to-end-orchestration (E2EO)) module 52, a service catalog storage 54, an AI/big-data processing module 56, a monitoring function module 58, an SDN controller 60, a configuration management module 62, a container management module 64, and a repository module 66. The OSS module 50 includes an inventory database 70, a ticket management module 72, a failure management module 74, and a performance management module 76. The E2EO module 52 includes a policy manager module 80, a slice manager module 82, and a life cycle management module 84. Those elements are implemented mainly by the processor 30a, the storage unit 30b and the communication unit 30c.

The above-mentioned functions may be implemented by executing, by the processor 30a, a program that is installed in the platform system 30, which is a computer, and that includes instructions corresponding to the above-mentioned functions. This program may be supplied to the platform system 30 via a computer-readable information storage medium such as an optical disc, a magnetic disk, a magnetic tape, a magneto-optical disc, a flash memory, or the like, or via the Internet or the like. The above-mentioned functions may also be implemented by a circuit block, a memory, and other LSIs. Further, a person skilled in the art would understand that the above-mentioned functions can be implemented in various forms by only hardware, by only software, or by a combination of hardware and software.

In this embodiment, for example, the container management module 64 executes life cycle management of a container including the construction of the container such as the deployment and setting of the container.

In this case, the platform system 30 in this embodiment may include a plurality of container management modules 64. In each of the plurality of container management modules 64, a container management tool such as Kubernetes, and a package manager such as Helm may be installed. Each of the plurality of container management modules 64 may execute the construction of a container such as the deployment of the container for a server group (Kubernetes cluster) associated with the container management module 64.

The container management module 64 is not required to be included in the platform system 30. The container management module 64 may be provided in, for example, a server (that is, the RAN 32 or the core network system 34) managed by the container management module 64, or a server that is annexed to the server managed by the container management module 64.

In this embodiment, the repository module 66 stores, for example, a container image of a container included in a functional unit group (for example, NF group) that implements a network service.

In this embodiment, the inventory database 70 is, for example, a database in which inventory information for a plurality of servers managed by the platform system 30 and arranged in the RAN 32 and the core network system 34 is stored.

In this embodiment, for example, the inventory database 70 stores inventory data including the physical inventory data and the logical inventory data. The inventory data indicates the current statuses of the configuration of an element group included in the communication system 1 and the link between the elements. In addition, the inventory data indicates the status of resources managed by the platform system 30 (for example, resource usage status).

Figure 6:
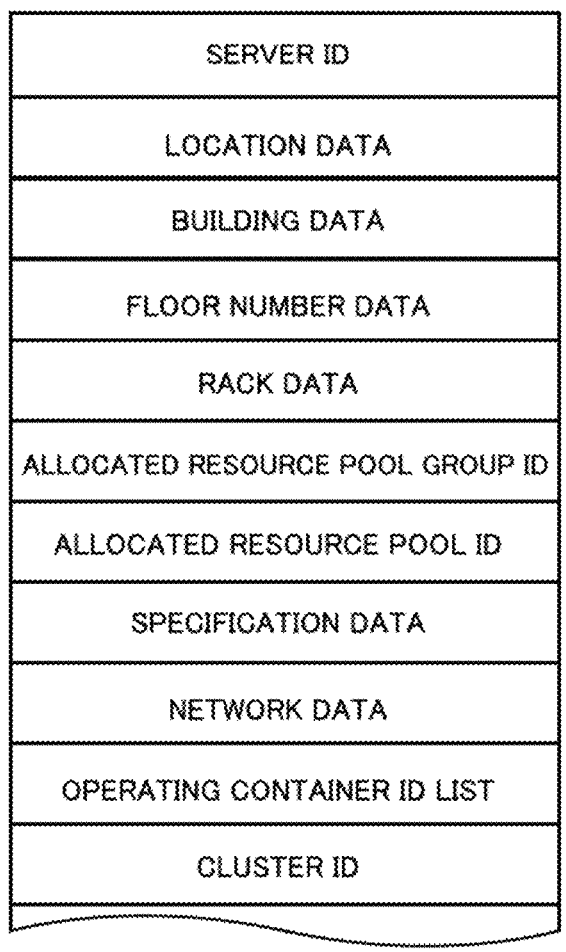
FIG. 6 is a diagram for illustrating an example of data structure of physical inventory data.

FIG. 6 is a diagram for illustrating an example of the data structure of the physical inventory data. The physical inventory data illustrated in FIG. 6 is associated with one server. The physical inventory data illustrated in FIG. 6 includes, for example, a server ID, location data, building data, floor number data, rack data, specification data, network data, an operating container ID list, and a cluster ID.

The server ID included in the physical inventory data is, for example, an identifier of the server associated with the physical inventory data.

The location data included in the physical inventory data is, for example, data indicating the location of the server (for example, the address of the location) associated with the physical inventory data.

The building data included in the physical inventory data is, for example, data indicating a building (for example, a building name) in which the server associated with the physical inventory data is arranged.

The floor number data included in the physical inventory data is, for example, data indicating a floor number at which the server associated with the physical inventory data is arranged.

The rack data included in the physical inventory data is, for example, an identifier of a rack in which the server associated with the physical inventory data is arranged.

The specification data included in the physical inventory data is data indicating the specifications of the server, such as the number of cores, the memory capacity, and the hard disk capacity, of the server, associated with the physical inventory data.

The network data included in the physical inventory data is, for example, data indicating an NIC included in the server associated with the physical inventory data, the number of ports included in the NIC, a port ID of each port, and the like.

The operating container ID list included in the physical inventory data is, for example, data indicating a list of identifiers (container IDs) of one or a plurality of container instances operating in the server associated with the physical inventory data.

The cluster ID included in the physical inventory data is, for example, an identifier of a cluster (for example, Kubernetes cluster) to which the server associated with the physical inventory data belongs.

In addition, the logical inventory data includes topology data for a plurality of elements included in the communication system 1, which indicates the current status of such link between the elements as illustrated in FIG. 4. For example, the logical inventory data includes topology data including an identifier of a certain NS and an identifier of one or a plurality of NFs under the control of the certain NS. In addition, for example, the logical inventory data includes topology data including an identifier of a certain network slice and an identifier of one or a plurality of NFs belonging to the certain network slice.

The inventory data may also indicate the current status of, for example, a geographical relationship or a topological relationship between the elements included in the communication system 1. The above-mentioned inventory data includes location data indicating locations at which the elements included in the communication system 1 are operating, that is, the current locations of the elements included in the communication system 1. It can be said therefrom that the above-mentioned inventory data indicates the current status of the geographical relationship between the elements (for example, geographical closeness between the elements).

In addition, the logical inventory data may include NSI data being data indicating attributes such as an identifier of an instance of a network slice and the type of the network slice. In addition, the logical inventory data may include NSSI data being data indicating attributes such as an identifier of an instance of a network slice subnet and the type of the network slice subnet.

The logical inventory data may also include NS data being data indicating attributes such as an identifier of an instance of an NS and the type of the NS. The logical inventory data may also include NF data indicating attributes such as an identifier of an instance of an NF and the type of the NF. The logical inventory data may also include CNFC data indicating attributes such as the identifier of a CNFC instance and the type of the CNFC. The logical inventory data may also include pod data indicating attributes such as an identifier of an instance of a pod included in the CNFC and the type of the pod. The logical inventory data may also include container data indicating attributes such as a container ID of an instance of a container included in the pod and the type of the container.

With the container ID of the container data included in the logical inventory data and the container ID included in the operating container ID list included in the physical inventory data, an instance of the container and the server on which the instance of the container is operating become linked to each other.

Further, data indicating various attributes such as the host name and the IP address may be set in the above-mentioned data included in the logical inventory data. For example, the container data may include data indicating the IP address of a container corresponding to the container data. Further, for example, the CNFC data may include data indicating the IP address and the host name of a CNFC indicated by the CNFC data.

The logical inventory data may also include data indicating NSSAI including one or a plurality of pieces of S-NSSAI, which is set for each NF.

Further, the inventory database 70 can appropriately grasp the resource status in cooperation with the container management module 64. Then, the inventory database 70 appropriately updates the inventory data stored in the inventory database 70 based on the latest resource status.

Further, for example, the inventory database 70 updates the inventory data stored in the inventory database 70 in accordance with execution of an action such as construction of a new element included in the communication system 1, a change of a configuration of the elements included in the communication system 1, scaling of the elements included in the communication system 1, or replacement of the elements included in the Communication system 1.

In this embodiment, the service catalog storage 54 stores, for example, service catalog data.

The service catalog data may include, for example, service template data indicating the logic to be used by the life cycle management module 84. This service template data includes information required for constructing the network service. Specifically, for example, the service template data includes information defining the NS, the NF, and the CNFC and information indicating an NS-NF-CNFC correspondence relationship. Further, for example, the service template data contains a workflow script for constructing the network service.

The service catalog data may also include information to be used by the policy manager module 80, the information relating to a threshold value (for example, threshold value for abnormality detection) to be compared to the calculated performance index value.

The service catalog data may also include, for example, slice template data indicating the logic to be used by the slice manager module 82. The slice template data includes information required for executing instantiation of the network slice.

The slice template data includes information on a "generic network slice template" defined by the GSM Association (GSMA) ("GSM" is a trademark). Specifically, the slice template data includes network slice template data (NST), network slice subnet template data (NSST), and network service template data. The slice template data also includes information indicating the hierarchical structure of those elements which is illustrated in FIG. 4.

In this embodiment, for example, the life cycle management module 84 constructs a new network service for which a purchase request has been made in response to the purchase request for the NS by the purchaser.

The life cycle management module 84 may execute, for example, the workflow script associated with the network service to be purchased in response to the purchase request. Then, the life cycle management module 84 may execute this workflow script, to thereby instruct the container management module 64 to deploy the container included in the new network service to be purchased. Then, the container management module 64 may acquire the container image of the container from the repository module 66 and deploy a container corresponding to the container image in the server.

In addition, in this embodiment, the life cycle management module 84 executes, for example, scaling or replacement of the element included in the communication system 1. In this case, the life cycle management module 84 may output a container deployment instruction or deletion instruction to the container management module 64. Then, the container management module 64 may execute, for example, a process for deploying a container or a process for deleting a container in accordance with the instruction. In this embodiment, the life cycle management module 84 can execute such scaling and replacement that cannot be handled by Kubernetes of the container management module 64.

The life cycle management module 84 may also output to the configuration management module 62 a configuration management instruction for a newly constructed element group or an existing element into which a new setting is input. Then, the configuration management module 62 may execute configuration management such as settings in accordance with the configuration management instruction.

The life cycle management module 84 may also output to the SDN controller 60 an instruction to create a communication path between two IP addresses linked to the two IP addresses.

In this embodiment, the slice manager module 82 executes, for example, instantiation of a network slice. In this embodiment, the slice manager module 82 executes, for example, instantiation of a network slice by executing the logic indicated by the slice template stored in the service catalog storage 54.

The slice manager module 82 includes, for example, a network slice management function (NSMF) and a network slice sub-network management function (NSSMF) described in the 3GPP specification "TS28 533." The NSMF is a function for generating and managing network slices, and provides NSI management. The NSSMF is a function for generating and managing network slice subnets forming a part of a network slice, and provides NSSI management.

The slice manager module 82 may output to the configuration management module 62 a configuration management instruction related to the instantiation of the network slice. Then, the configuration management module 62 may execute configuration management such as settings in accordance with the configuration management instruction.

The slice manager module 82 may also output to the SDN controller 60 an instruction to create a communication path between two IP addresses linked to the two IP addresses.

In this embodiment, for example, the configuration management module 62 executes configuration management such as settings of the element group including the NFs in accordance with the configuration management instruction received from the life cycle management module 84 or the slice manager module 82.

In this embodiment, for example, the SDN controller 60 creates the communication path between the two IP addresses linked to the creation instruction in accordance with the instruction to create the communication path, which has been received from the life cycle management module 84 or the slice manager module 82.

In this case, for example, the SDN controller 60 may use segment routing technology (for example, segment routing IPv6 (SRv6)) to construct an NSI and NSSI for the server or an aggregation router present between communication paths. The SDN controller 60 may also generate an NSI and NSSI extending over a plurality of NFs to be set by issuing, to the plurality of NFs to be set, a command to set a common virtual local area network (VLAN) and a command to assign a bandwidth and a priority indicated by the setting information to the VLAN.

The SDN controller 60 may change the upper limit of the bandwidth that can be used for communication between two IP addresses without constructing a network slice.

In this embodiment, the monitoring function module 58 monitors, for example, the element group included in the communication system 1 based on a given management policy. In this case, for example, the monitoring function module 58 may monitor the element group based on a monitoring policy designated by the purchaser when the purchaser purchases the network service.

In this embodiment, the monitoring function module 58 executes monitoring at various levels, such as a slice level, an NS level, an NF level, a CNFC level, and a level of hardware such as the server.

For example, the monitoring function module 58 may set a module for outputting metric data in the hardware such as the server, or an element illustrated in FIG. 4 so that monitoring can be performed at the various levels described above. In this case, for example, the NF may output the metric data indicating a metric that can be measured (can be identified) by the NF to the monitoring function module 58. Further, the server may output the metric data indicating a metric relating to the hardware that can be measured (can be identified) by the server to the monitoring function module 58.

In addition, for example, the monitoring function module 58 may deploy, in the server, a sidecar container for aggregating the metric data indicating the metrics output from a plurality of containers in units of CNFCs (microservices). This sidecar container may include an agent called "exporter." The monitoring function module 58 may repeatedly execute a process for acquiring the metric data aggregated in units of microservices from the sidecar container, at predetermined monitoring intervals through use of the mechanism of Prometheus.

The monitoring function module 58 may monitor performance index values regarding performance indices described in, for example, "TS 28.552, Management and orchestration; 5G performance measurements" or "TS 28.554, Management and orchestration; 5G end to end Key Performance Indicators (KPI)." Then, the monitoring function module 58 may acquire metric data indicating the performance index values to be monitored.

Then, for example, when the monitoring function module 58 acquires the above-mentioned metric data, the monitoring function module 58 outputs the metric data to the AI/big data processing module 56.

Further, the elements such as the network slice, the NS, the NF, the CNFC that are included in the communication system 1 and the hardware such as the server notify the monitoring function module 58 of various alerts (for example, notify the monitoring function module 58 of an alert with the occurrence of a failure as a trigger).

Then, for example, when the monitoring function module 58 receives the above-mentioned notification of the alert, the monitoring function module 58 outputs the notification to the AI/big-data processing module 56.

In this embodiment, the AI/big-data processing module 56 accumulates, for example, pieces of metric data and notifications of the alerts that have been output from the monitoring function module 58. In addition, for example, the AI/big-data processing module 56 stores in advance a trained machine learning model.

Then, in this embodiment, for example, the AI/big-data processing module 56 executes, based on the accumulated pieces of metric data and the above-mentioned machine learning model, an estimation process such as a future prediction process for a use status and quality of service of the communication system 1. The AI/big-data processing module 56 may generate estimation result data indicating results of the estimation process.

In this embodiment, for example, the performance management module 76 calculates, based on a plurality of pieces of metric data, a performance index value (for example, KPI) that is based on metrics indicated by those pieces of metric data. The performance management module 76 may calculate a performance index value (for example, performance index value relating to an end-to-end network slice) which is a comprehensive evaluation of a plurality of types of metrics and cannot be calculated from a single piece of metric data. The performance management module 76 may generate comprehensive performance index value data indicating a performance index value being a comprehensive evaluation.

The performance management module 76 may acquire the metric data from the monitoring function module 58 through intermediation of the AI/big-data processing module 56 as illustrated in FIG. 5, or may acquire the metric data directly from the monitoring function module 58. The performance management module 76 may also calculate the performance index value based on the above-mentioned estimation result data.

In this embodiment, the failure management module 74 detects the occurrence of a failure in the communication system 1 based on, for example, at least any one of the above-mentioned metric data, the above-mentioned notification of the alert, the above-mentioned estimation result data, or the above-mentioned comprehensive performance index value data. The failure management module 74 may detect, for example, the occurrence of a failure that cannot be detected from a single piece of metric data or a single notification of the alert, based on a predetermined logic. The failure management module 74 may also generate detection failure data indicating the detected failure.

The failure management module 74 may acquire the metric data and the notification of the alert directly from the monitoring function module 58 or through intermediation of the AI/big-data processing module 56 and the performance management module 76. The failure management module 74 may also acquire the estimation result data directly from the AI/big-data processing module 56 or through intermediation of the performance management module 76.

In this embodiment, the policy manager module 80 executes a predetermined determination process based on, for example, at least any one of the above-mentioned metric data, the above-mentioned notification of the alert, the above-mentioned estimation result data, the above-mentioned comprehensive performance index value data, or the above-mentioned detection failure data.

Then, the policy manager module 80 may execute an action corresponding to a result of the determination process. For example, the policy manager module 80 may output an instruction to construct a network slice to the slice manager module 82. The policy manager module 80 may also output an instruction for scaling or replacement of the elements to the life cycle management module 84 based on the result of the determination process.

In this embodiment, the ticket management module 72 generates, for example, a ticket indicating information to be notified to an administrator of the communication system 1. The ticket management module 72 may generate a ticket indicating details of the detection failure data. The ticket management module 72 may also generate a ticket indicating a value of the performance index value data or the metric data. The ticket management module 72 may also generate a ticket indicating a determination result obtained by the policy manager module 80.

Then, the ticket management module 72 notifies the administrator of the communication system 1 of the generated ticket. The ticket management module 72 may send, for example, an email to which the generated ticket is attached to an email address of the administrator of the communication system 1.

In this embodiment, when a change of a state of the network service illustrated in FIG. 3 occurs, for example, when scale-out of the UPF 46 illustrated in FIG. 3 occurs, a validation of such a change of the state is performed. As described above, the network service corresponds to an example of the service providing means for providing a communication service. Herein, the change of the state of the network service may be a change of the state of a software element or a change of the state of a hardware element (computer resource).

A process relating to the validation of the change of the state of the network service, which is executed by the platform system 30 in this embodiment, is further described in the following.

In this embodiment, for example, the monitoring function module 58 monitors the operating network service exemplified in FIG. 3.

In this embodiment, the monitoring function module 58 monitors, for example, the use status of a communication service provided by a network service which is independent of the state of the network service (for example, the number of UPFs 46 included in the network service). In this case, the monitoring function module 58 may monitor a total processing load amount required to be processed by the network service as an example of the use status of a communication service provided by a network service which is independent of the state of the network service. More specifically, for example, at least one of a total throughput of the communication service or the total number of users (total number of subscribers) of the communication service may be monitored.

In addition, in this embodiment, the monitoring function module 58 monitors the use status of a communication service provided by a network service which is dependent on the state of the network service (for example, the number of UPFs 46 included in the network service). In this case, the monitoring function module 58 may monitor a performance index value indicating the quality of service of the communication service as an example of the use status of a communication service provided by a network service which is dependent on the state of the network service. More specifically, for example, an average throughput per UE (UE 20) in an area covered by the communication service is monitored.

The use status of a communication service provided by a network service which is independent of the state of the network service is hereinafter referred to as "state-independent use status." Meanwhile, the use status of a communication service provided by a network service which is dependent on the state of the network service is hereinafter referred to as "state-dependent use status."

In the following description, as an example, it is assumed that the monitoring function module 58 monitors the total throughput of the communication service and the total number of users (total number of subscribers) of the communication service as the state-independent use status. It is also assumed that the monitoring function module 58 monitors the average throughput per UE (UE 20) in the area covered by the communication service as the state-dependent use status.

Then, in this embodiment, as described above, the pieces of metric data indicating the above-mentioned performance index value monitored by the monitoring function module 58 are accumulated in the AI/big-data processing module 56.

FIG. 7 is a table for showing an example of total processing load amount data in time series, which is a part of the pieces of metric data accumulated in the AI/big-data processing module 56. FIG. 7 shows an example obtained when the metric data is acquired at intervals of 15 minutes, but the metric data is not required to be acquired at intervals of 15 minutes.

The total processing load amount data shown in FIG. 7 includes time stamp data, total throughput data, and total number-of-user data. The time stamp data included in the total processing load amount data indicates an identification date and time of the performance index value shown in the total processing load amount data. The total throughput data included in the total processing load amount data indicates a total throughput identified at the identification date and time. The total number-of-user data included in the total processing load amount data indicates the total number of users (total number of subscribers) using the communication service provided by the network service illustrated in FIG. 3, which was identified at the identification date and time.

Then, the AI/big-data processing module 56 calculates an index value indicating the state-dependent use status in a status before the change of the state at present or at a future time based on: an actual result value of the state-independent use status at a timing after the change of the state; and the state of the network service before the change of the state.

In this case, as described above, the actual result value of the state-independent use status may be an actual result value indicating the total processing load amount required to be processed by the network service. More specifically, for example, this actual result value may be an actual result value of at least one of the total throughput of the communication service or the total number of users of the communication service.

The index value indicating the state-dependent use status may be the performance index value indicating the quality of service of the communication service. More specifically, for example, this index value may be the average throughput per UE (UE 20) in the area covered by the communication service.

Now, an example of the calculation of the index value indicating the state-dependent use status in a status before the change of the state at present or at a future time, which is performed by the AI/big-data processing module 56, is described.

Figure 8:
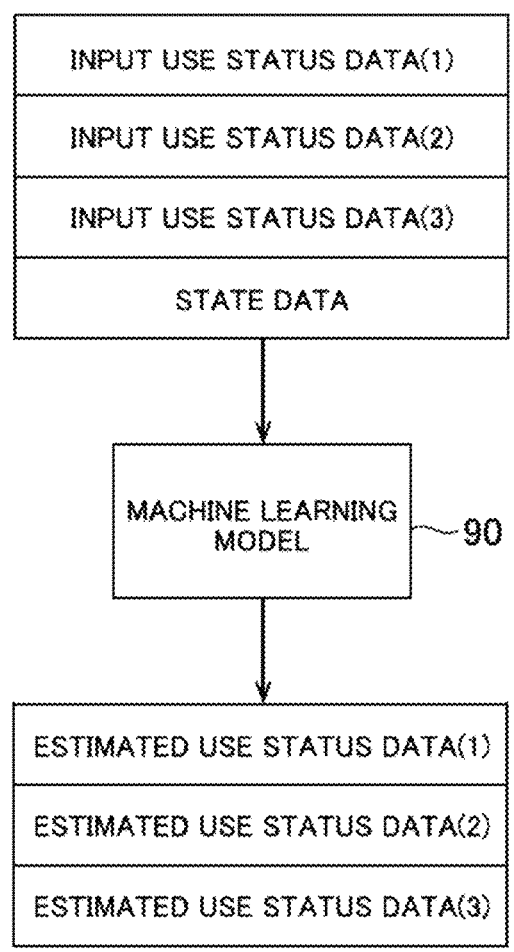
FIG. 8 is a diagram for schematically illustrating an example of a trained machine learning model.

FIG. 8 is a diagram for schematically illustrating a trained machine learning model 90, which is stored in the AI/big-data processing module 56. The machine learning model 90 illustrated in FIG. 8 outputs the estimation result data in response to input of input data.

As illustrated in FIG. 8, the input data includes, for example, a predetermined number of pieces of input use status data and state data indicating the state of the network service. In the following description, it is assumed that the input data includes three pieces of input use status data, but the number of pieces of input use status data included in the input data is not limited to three.

In the example of FIG. 8, the input data includes the pieces of input use status data indicating results of the identification of the state-independent use status for the last three times. In FIG. 8, the pieces of input use status data corresponding to the latest, the second latest, and the third latest results of the identification are represented as input use status data (1), input use status data (2), and input use status data (3), respectively. The input use status data includes, for example, the total throughput data and the total number-of-user data.

The identification date and time of the use status of the communication service associated with the input use status data (1) (that is, the latest identification date and time) is hereinafter referred to as "reference date and time."

As illustrated in FIG. 8, the input data also includes the state data. The state data indicates, for example, the state of the network service illustrated in FIG. 3. In the following description, it is assumed that the state data indicates the number of UPFs 46 included in the network service. The number of UPFs 46 indicated by the state data may be, or may not be, the number of UPFs 46 included in the network service at a timing when the state-independent use status was identified.

Then, in the example of FIG. 8, the estimation result data includes a predetermined number of pieces of estimated use status data. In the following description, it is assumed that the estimation result data includes three pieces of estimated use status data, but the number of pieces of estimated use status data included in the estimation result data is not limited to three.

The plurality of pieces of estimated use status data included in the estimation result data indicate estimated values of the index value indicating the state-dependent use status at timings different from one another. In the following description, it is assumed that the estimated use status data includes estimated average throughput data indicating an estimated value of the average throughput.

A value indicated by the estimated use status data output in response to the input of the input data is a value premised on the state indicated by the state data included in the input data. For example, when a value of the state data included in the input data is "3", the estimated average throughput data indicating the estimated value of the average throughput obtained when the network service includes three UPFs 46 is output in response to the input of the input data. In another case, for example, when the value of the state data included in the input data is "4", the estimated average throughput data indicating the estimated value of the average throughput obtained when the network service includes four UPFs 46 is output in response to the input of the input data.

In FIG. 8, the estimated use status data including the estimated average throughput data indicating the estimated value of the average throughput obtained a first predetermined time after the reference date and time (for example, 15 minutes after the reference date and time) is represented as estimated use status data (1). In addition, the estimated use status data including the estimated average throughput data indicating the estimated value of the average throughput obtained a second predetermined time after the reference date and time (for example, 30 minutes after the reference date and time) is represented as estimated use status data (2). Further, the estimated use status data including the estimated average throughput data indicating the estimated value of the average throughput obtained a third predetermined time after the reference date and time (for example, 45 minutes after the reference date and time) is represented as estimated use status data (3).

Figure 9:
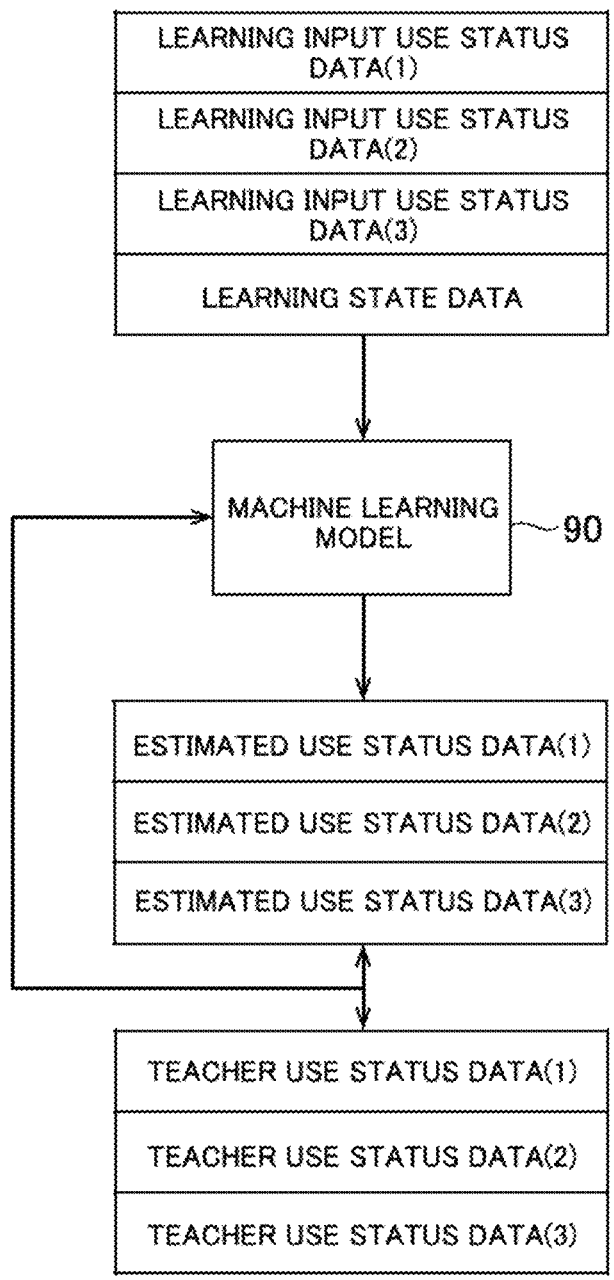
FIG. 9 is a diagram for schematically illustrating an example of learning performed by the machine learning model.

FIG. 9 is a diagram for illustrating an example of learning performed by the machine learning model 90 illustrated in FIG. 8. The machine learning model 90 is subjected to, for example, learning using a plurality of pieces of training data in advance. The training data includes, for example, learning input data and teacher data.

In addition, as illustrated in FIG. 9, the learning input data includes the same number of pieces of learning input use status data as the number of pieces of input use status data included in the above-mentioned input data. The learning input data also includes, for example, learning state data indicating the number of UPFs 46.

Further, as illustrated in FIG. 9, the teacher data includes the same number of pieces of teacher use status data as the number of pieces of estimated use status data included in the above-mentioned estimation result data.

In this embodiment, for example, learning input use status data (1) included in certain training data includes the total throughput data and the total number-of-user data in the measurement at a certain date and time. In addition, learning input use status data (2) included in the training data includes the total throughput data and the total number-of-user data in the measurement immediately before the measurement at the certain date and time. Further, learning input use status data (3) included in the training data includes the total throughput data and the total number-of-user data in the measurement two times before the measurement at the certain date and time.

Meanwhile, teacher use status data (1) included in the training data includes average throughput data indicating the value of the average throughput exhibited 15 minutes after the certain date and time. In addition, teacher use status data (2) included in the training data includes average throughput data indicating the value of the average throughput exhibited 30 minutes after the certain date and time. Further, teacher use status data (3) included in the training data includes average throughput data indicating the value of the average throughput exhibited 45 minutes after the certain date and time.

The training data also includes the learning state data indicating the number of UPFs 46, which is a premise in the calculation of the average throughput indicated by the teacher use status data included in the training data.

Then, the machine learning model 90 outputs the estimation result data in response to the input of the learning input data included in the training data. The estimation result data includes a predetermined number of (for example, three) pieces of estimated use status data. Then, an error (comparison result) between the estimation result data output in response to the input of the learning input data included in the training data and the teacher data included in the training data is identified. Then, based on the identified error, a value of a parameter of the machine learning model 90 is updated by, for example, an error back-propagation method. Then, the above-mentioned process is executed for a plurality of pieces of training data, to thereby execute the learning of the machine learning model 90.

The above-mentioned training data may be generated based on, for example, pieces of data indicating the monitoring results of the total throughput, the total number of users, and the average throughput, which are accumulated in the AI/big-data processing module 56. The above-mentioned training data may also be manually created by, for example, an operator of the communication system 1 based on an empirical rule.

The implementation of the machine learning model 90 is not particularly limited. For example, the machine learning model 90 may be a neural network or a machine learning model other than the neural network.

Then, the AI/big-data processing module 56 generates prediction result data exemplified in FIG. 10 to FIG. 12 based on the estimation result data output by the trained machine learning model 90, which is illustrated in FIG. 8.

As illustrated in FIG. 10 to FIG. 12, the prediction result data includes, for example, reference date-and-time data, number-of-UPF data, and a plurality of pieces of average throughput prediction result data. The average throughput prediction result data is linked to prediction target date-and-time data.

For example, as described above, it is assumed that the trained machine learning model 90 outputs the estimation result data in response to the input of the input data.

In this case, the reference date and time in the above-mentioned estimation, that is, a date and time at which the total throughput and the total number of users that are indicated by the input use status data (1) included in the input data were identified, is set as a value of the reference date-and-time data.

In addition, for example, the value of the state data included in the input data is set as a value of the number-of-UPF data.

In addition, the average throughput prediction result data indicates a predicted value of the average throughput at the date and time indicated by the prediction target date-and-time data linked to the average throughput prediction result data. That is, a value of the estimated use status data (1) included in the above-mentioned estimation result data is set as a value of the first piece of average throughput prediction result data. Further, a value of the estimated use status data (2) included in the above-mentioned estimation result data is set as a value of the second piece of average throughput prediction result data. Further, a value of the estimated use status data (3) included in the above-mentioned estimation result data is set as a value of the third piece of average throughput prediction result data.

In addition, the average throughput prediction result data corresponding to the estimated use status data (1) is linked to the prediction target date-and-time data indicating the date and time of 15 minutes after the reference date and time. Further, the average throughput prediction result data corresponding to the estimated use status data (2) is linked to the prediction target date-and-time data indicating the date and time of 30 minutes after the reference date and time. Further, the average throughput prediction result data corresponding to the estimated use status data (3) is linked to the prediction target date-and-time data indicating the date and time of 45 minutes after the reference date and time.

In this embodiment, for example, a default number of UPFs 46 included in the network service is determined in advance. This default number of UPFs 46 determined in advance is referred to as "reference number." The reference number may be a minimum number of UPFs 46 included in the network service. In the following description, for example, it is assumed that the reference number is "3".

In this case, prediction result data is generated based on the input data in which "3" is set as a value of the above-mentioned state data.

FIG. 10 is an illustration of prediction result data generated based on the input data in which the reference date and time is 9:00 on Dec. 1, 2021.

In this case, the input use status data (1) included in the input data includes, for example, the total throughput data having a value of "x1 (102)" and the total number-of-user data having a value of "x2 (102)," which are shown in FIG. 7. The input use status data (2) included in the input data includes, for example, the total throughput data having a value of "x1 (101)" and the total number-of-user data having a value of "x2 (101)," which are shown in FIG. 7. Further, the input use status data (3) included in the input data includes, for example, the total throughput data having a value of "x1 (100)" and the total number-of-user data having a value of "x2 (100)," which are shown in FIG. 7.

The input data also includes the state data having a value of "3".

Then, in response to the input of the input data, the estimation result data including the estimated use status data (1) having a value of "y1_3 (103)," the estimated use status data (2) having a value of "y2_3 (104)," and the estimated use status data (3) having a value of "y3_3 (105)" is output from the trained machine learning model 90. Then, the prediction result data illustrated in FIG. 10 is generated based on this estimation result data.

In the above-mentioned example, for example, regarding one date and time, the average throughput is estimated in the estimation for each of three times. For example, regarding 9:45, the average throughput is estimated in the estimation for each of the three times with the reference date and time being 9:00, 9:15, and 9:30.

Instead of the machine learning model 90, the AI/big-data processing module 56 may store: a calculation formula (function) for calculating a value of the estimation result data based on a value of the input data; or a table in which the value of the input data and the value of the estimation result data are associated with each other. Then, the AI/big-data processing module 56 may generate a predetermined number of pieces of estimated use status data based on the above-mentioned input data along with the calculation formula (function) or the table. Then, the prediction result data may be generated based on the estimated use status data generated in this manner.

Then, in this embodiment, for example, the policy manager module 80 determines whether or not to change a state of the service providing means based on the prediction result data. Then, the platform system 30 changes the state of the service providing means when it is determined that the state of the service providing means is to be changed. In this case, for example, the container management module 64 may change the state of the service providing means. In another case, the configuration management module 62 may change the state of the service providing means.

In this case, for example, it is determined whether or not to scale out the UPF 46 included in the network service. A condition for scaling out the UPF 46 included in the network service is hereinafter referred to as "scale-out condition."

That is, when the scale-out condition is satisfied, it is determined that the UPF 46 included in the network service is to be scaled out.

The scale-out condition may be a condition relating to one or a plurality of pieces of prediction result data. For example, the scale-out condition may be a condition that "the value of at least one piece of average throughput prediction result data included in one piece of prediction result data is equal to or smaller than a predetermined value." Further, the scale-out condition may be a condition that "the value of the average throughput prediction result data regarding one certain date and time is equal to or smaller than a predetermined value three times in a row." Further, the scale-out condition may be a condition that "the total sum of values obtained by subtracting values of the average throughput prediction result data from a predetermined reference value regarding one certain date and time is equal to or larger than the predetermined value." Those scale-out conditions are merely examples, and the scale-out condition is not limited to those conditions.

When the scale-out condition is satisfied, the policy manager module 80, the life cycle management module 84, the container management module 64, and the configuration management module 62 execute the scale-out of the UPF 46. It may take several tens of minutes from start to completion of the scale-out of the UPF 46.

Then, as described above, the AI/big-data processing module 56 calculates the index value indicating the state-dependent use status in a status before the change of the state at present or at a future time based on: the actual result value of the state-independent use status at a timing after the change of the state; and the state of the network service before the change of the state.

In this case, the AI/big-data processing module 56 may calculate the index value indicating the use status of the communication service dependent on the scale of the service providing means in a status before the execution of the scale-out at present or at a future time based on: the actual result value of the use status of the communication service independent of the scale of the service providing means at a timing after at least partial completion of the scale-out; and the scale of the service providing means before the start of the scale-out.

In this case, the use status of the communication service independent of the scale of the service providing means corresponds to the state-independent use status, and the use status of the communication service dependent on the scale of the service providing means corresponds to the state-dependent use status. In addition, the number of UPFs 46 included in the network service corresponds to the scale of the service providing means.

For example, after at least partial completion of the scale-out, the AI/big-data processing module 56 generates not only prediction result data based on the input data in which the number of UPFs 46 that have been subjected to the scale-out is set as the value of the state data, but also prediction result data based on the input data in which the number of UPFs 46 that have not been subjected to the scale-out is set as the value of the state data. In this case, after completion of the scale-out, the AI/big-data processing module 56 may generate not only prediction result data based on the input data in which the number of UPFs 46 that have been subjected to the scale-out is set as the value of the state data, but also prediction result data based on the input data in which the number of UPFs 46 that have not been subjected to the scale-out is set as the value of the state data.

It is assumed that, for example, the scale-out increases the number of UPFs 46 from 3 to 4. It is also assumed that the scale-out has been completed by 10:00 on Dec. 1, 2021.

In this case, prediction result data illustrated in FIG. 11 and prediction result data illustrated in FIG. 12 are generated based on the input data in which the reference date and time is 10:00 on Dec. 1, 2021.

In this case, the input use status data (1) included in the input data for generating the prediction result data illustrated in FIG. 11 includes, for example, the total throughput data having a value of "x1 (106)" and the total number-of-user data having a value of "x2 (106)," which are shown in FIG. 7. The input use status data (2) included in the input data includes, for example, the total throughput data having a value of "x1 (105)" and the total number-of-user data having a value of "x2 (105)," which are shown in FIG. 7. Further, the input use status data (3) included in the input data includes, for example, the total throughput data having a value of "x1 (104)" and the total number-of-user data having a value of "x2 (104)," which are shown in FIG. 7.

The input data also includes the state data having a value of "4".

Then, in response to the input of the input data, the estimation result data including the estimated use status data (1) having a value of "y1_4 (107)," the estimated use status data (2) having a value of "y2_4 (108)," and the estimated use status data (3) having a value of "y3_4 (109)" is output from the trained machine learning model 90. Then, the prediction result data illustrated in FIG. 11 is generated based on this estimation result data.

In addition, the input use status data (1) included in the input data for generating the prediction result data illustrated in FIG. 12 includes the same data as that of the input use status data (1) included in the input data for generating the prediction result data illustrated in FIG. 11. Further, the input use status data (2) included in the input data for generating the prediction result data illustrated in FIG. 12 includes the same data as that of the input use status data (2) included in the input data for generating the prediction result data illustrated in FIG. 11. Further, the input use status data (3) included in the input data for generating the prediction result data illustrated in FIG. 12 includes the same data as that of the input use status data (3) included in the input data for generating the prediction result data illustrated in FIG. 11.

The input data also includes the state data having a value of "3".

Then, in response to the input of the input data, the estimation result data including the estimated use status data (1) having a value of "y1_3 (107)," the estimated use status data (2) having a value of "y2_3 (108)," and the estimated use status data (3) having a value of "y3_3 (109)" is output from the trained machine learning model 90. Then, the prediction result data illustrated in FIG. 12 is generated based on this estimation result data.

Then, in the same manner as described above with reference to FIG. 10, the policy manager module 80 determines whether or not the scale-out condition is satisfied based on one or a plurality of pieces of prediction result data in which the value of the number-of-UPF data is "4". When the scale-out condition is satisfied, the policy manager module 80, the life cycle management module 84, the container management module 64, and the configuration management module 62 start further scale-out of the UPF 46.

The policy manager module 80 also determines whether or not the index value indicating the state-dependent use status in a status before the change of the state of the service providing means at present or at a future time satisfies a predetermined condition based on one or a plurality of pieces of prediction result data in which the value of the number-of-UPF data is "3". The predetermined condition is hereinafter referred to as "notification condition."

Herein, the notification condition may be a condition to be satisfied when, for example, the executed scale-out is considered to be invalid.

The notification condition may be a condition relating to one or a plurality of pieces of prediction result data. For example, the notification condition may be a condition that "the value of at least one piece of average throughput prediction result data included in one piece of prediction result data is equal to or larger than a predetermined value." Further, the notification condition may be a condition that "the value of the average throughput prediction result data regarding one certain date and time is equal to or larger than a predetermined value three times in a row." Further, the notification condition may be a condition that "the total sum of values obtained by subtracting values of the average throughput prediction result data from a predetermined reference value regarding one certain date and time is equal to or smaller than the predetermined value." Those notification conditions are merely examples, and the notification condition is not limited to those conditions.

Then, in this embodiment, the ticket management module 72 outputs, for example, a result of determination as to whether or not the index value indicating the use status of the communication service dependent on the state of the service providing means in a status before the change of the state of the service providing means at present or at a future time satisfies a predetermined condition. When the notification condition is satisfied, the ticket management module 72 may generate, for example, a ticket indicating that the notification condition has been satisfied. Then, the ticket management module 72 may notify the administrator of the communication system 1 of the ticket.

Then, the administrator of the communication system 1 may examine the ticket to perform, as the requirement arises, an operation for executing scale-in of the UPF 46 for the platform system 30. Then, the platform system 30 may execute the scale-in of the UPF 46 based on the operation. In addition, the administrator may update the machine learning model 90.

Figure 13:
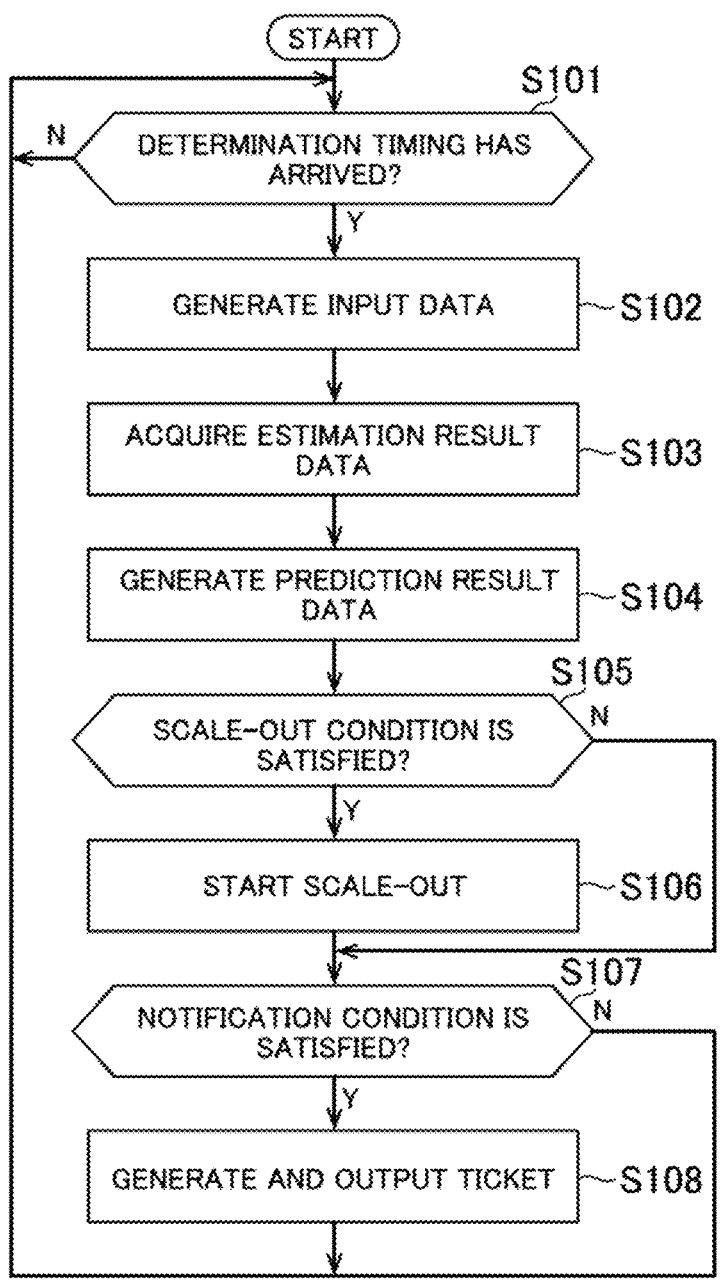
FIG. 13 is a flow chart for illustrating an example of a flow of a process performed by the platform system in the one embodiment of the present invention.

Now, an example of a flow of a process performed by the platform system 30 in this embodiment is described with reference to a flow chart exemplified in FIG. 13.

In this process example, the monitoring function module 58 acquires metric data as appropriate (for example, at intervals of 15 minutes). Then, the AI/big-data processing module 56 accumulates the pieces of metric data acquired by the monitoring function module 58.

Further, the AI/big-data processing module 56 is monitoring arrival of a predetermined determination timing (Step S101). In this embodiment, for example, the determination timing arrives at intervals of 15 minutes. In this process example, it is assumed that the process steps of from Step S102 to Step S108 are executed with the acquisition of new piece of metric data as a trigger. An acquisition timing of the metric data and the determination timing may be the same or may differ from each other. Further, an acquisition interval of the metric data and the interval of the determination timing may be the same or may differ from each other.

When the determination timing has arrived, the AI/big-data processing module 56 generates input data based on the accumulated pieces of metric data (Step S102). In this case, when the number of UPFs 46 included in the network service is the reference number, one piece of input data is generated. When the number of UPFs 46 included in the network service is not the reference number, a plurality of pieces of input data respectively associated with numbers equal to or larger than the reference number and equal to or smaller than the current number of UPFs 46 are generated.

Then, the AI/big-data processing module 56 inputs the input data generated in the process step of Step S102 to the machine learning model 90, and acquires the estimation result data output from the machine learning model 90 in response to the input (Step S103). The process step of Step S103 is executed for each piece of input data generated in the process step of Step S102.

Then, the AI/big-data processing module 56 generates prediction result data based on the estimation result data acquired in the process step of Step S103 (Step S104). The process step of Step S104 is executed for each of pieces of estimation result data acquired in the process step of Step S103.

Then, the policy manager module 80 determines whether or not the prediction result data generated in the process step of Step S104 satisfies the scale-out condition (Step S105). In this case, for example, the policy manager module 80 may determine whether or not the prediction result data associated with the current number of UPFs 46 satisfies the scale-out condition.

When it is determined in the process step of Step S105 that the scale-out condition is satisfied ("Y" in Step S105), the policy manager module 80, the life cycle management module 84, the container management module 64, and the configuration management module 62 execute the scale-out of the UPF 46 (Step S106).

When it is determined in the process step of Step S105 that the scale-out condition is not satisfied ("N" in Step S105) or when the process step of Step S106 is ended, the policy manager module 80 determines whether or not the prediction result data generated in the process step of Step S104 satisfies the notification condition (Step S107). In this case, for example, the policy manager module 80 may determine whether or not the pieces of prediction result data associated with the reference number satisfy the notification condition. In another case, the policy manager module 80 may determine whether or not the pieces of prediction result data associated with the number different from the current number of UPFs 46 satisfy the notification condition.

When it is determined that the notification condition is satisfied ("Y" in Step S107), the ticket management module 72 generates and outputs a ticket (Step S108), and the process returns to the process step of Step S101.

In addition, when it is determined in the process step of Step S107 that the notification condition is not satisfied ("N" in Step S107), the process also returns to the process step of Step S101.

When the number of UPFs 46 is the reference number, the process steps of Step S107 and Step S108 are not executed. In this case, after the process step of Step S106 is executed or when it is confirmed that the scale-out condition is not satisfied in the process step of Step S105, the process returns to the process step of Step S101.

Further, when the number of UPFs 46 included in the network service is not the reference number in the process step of Step S102, a piece of input data associated with the reference number and a piece of input data associated with the current number of UPFs 46 (that is, two pieces of input data) may be generated.

The scale-out is not required to increase the UPF 46 by one at a time, and such scale-out that increases the number of UPFs 46 by two or more at a time may be executed.

In this embodiment, even when the state of the service providing means is changed, a validation of the change of the state of the service providing means is performed based on the index value indicating the state-dependent use status in a status before the change of the state. In this manner, a validation of the change of the state of the service providing means is performed through use of the index value that cannot be measured, to thereby be able to accurately perform a validation of the change of the state of the service providing means in this embodiment.

Further, in this embodiment, the policy manager module 80 may determine whether or not a combination of the calculated index value and the actual result value of the use status of the communication service indicated by the index value satisfies a predetermined condition.

As described above, in this embodiment, the monitoring function module 58 acquires the metric data indicating the average throughput. Then, a difference between the average throughput indicated by the metric data acquired by the monitoring function module 58 and the average throughput included in the prediction result data regarding a certain date and time may be identified. In addition, a condition that "the identified difference is larger than a predetermined value" may be the above-mentioned notification condition. With this configuration, it is possible to perform a validation of the change of the state of the service providing means based on a comparison between the actual result value and the predicted value. As a result, it is possible to perform a validation of the change of the state of the service providing means with higher accuracy.

Further, the change of the state of the service providing means in this embodiment is not limited to the scale-out. The change of the state of the service providing means in this embodiment may be, for example, replacement or a change of a server setting.

The present invention is not limited to the above-mentioned embodiment.

For example, the AI/big-data processing module 56 may include a plurality of trained machine learning models 90 which are respectively associated with time periods, such as by day of the week, by month, and by season. Then, the prediction result data may be generated through use of the trained machine learning model 90 which is associated with the time period to which the reference date and time belongs.

Further, the functional unit in this embodiment is not limited to those illustrated in FIG. 3. For example, the functional unit in this embodiment may be a DU, an access and mobility management function (AMF), a session management function (SMF), or another network node.

Further, the functional unit in this embodiment is not required to be an NF in 5G. For example, the functional unit in this embodiment may be an eNodeB, a vDU, a vCU, a packet data network gateway (P-GW), a serving gateway (S-GW), a mobility management entity (MME), a home subscriber server (HSS), or another network node in 4G.

Further, the functional unit in this embodiment may not be a CNF but may be a virtualized network function (VNF), which is a virtual-machine-based (VM-based) functional unit using a hypervisor-type or host-type virtualization technology. Further, the functional unit in this embodiment is not required to be implemented by software, and may be implemented by hardware, for example, by an electronic circuit. Further, the functional unit in this embodiment may be implemented by a combination of an electronic circuit and software.

The invention claimed is:

1. A validation system, comprising:
   at least one processor; and
   at least one memory device storing instructions which, when executed by the at least one processor, cause the at least one processor to perform operations comprising:
      changing a state of an element for providing a communication service;
      calculating an index value indicating a state-dependent use status, the state-dependent use status representing a use status of the communication service that is dependent on the state of the element, the index value calculated in a status before the change of the state, at present, or at a future time, the calculation of the index value based on:
         an actual result value of a state-independent use status, the state-independent use status representing a use status of the communication service that is independent of the state of the element, the actual result value at a timing after the change of the state; and
         the state of the element before the change of the state; and
      determining whether the calculated index value satisfies a predetermined condition.

2. The validation system according to claim 1, wherein the actual result value of the state-independent use status is an actual result value indicating a total processing load amount required to be processed by the element.

3. The validation system according to claim 2, wherein the actual result value of the state-independent use status is an actual result value of at least one of a total throughput of the communication service or the total number of users of the communication service.

4. The validation system according to claim 1, wherein the index value indicating the state-dependent use status is a performance index value indicating quality of service of the communication service.

5. The validation system according to claim 4, wherein the index value indicating the state-dependent use status indicates an average throughput per user equipment (UE) in an area covered by the communication service.

6. The validation system according to claim 1, wherein determining comprises determining whether a combination of the calculated index value and the actual result value of the state-independent use status of the communication service indicated by the index value satisfies a predetermined condition.

7. The validation system according to claim 1,
   wherein changing comprises executing scale-out of the element, and
   wherein calculating comprises calculating the index value indicating the state-dependent use status, the state-dependent use status representing a use status of the communication service dependent on a scale of the element, the index value calculated in a status before the execution of the scale-out, at present, or at a future time based on:
      the actual result value of the state-independent use status, the state-independent use status representing a use status of the communication service independent of the scale of the element, the actual result value at a timing after at least partial completion of the scale-out; and
      the scale of the element before start of the scale-out.

8. The validation system according to claim 7,
wherein changing comprises executing the scale-out of a user plane function (UPF), and wherein the scale of the element is the number of UPFs.

9. The validation system according to claim 1, the operations further comprise outputting a result of the determination.

10. The validation system according to claim 1, wherein the calculating comprises
applying a trained neural network model to the actual result value and the state of the element to obtain a time series of estimated state-dependent use status values; and
generating the index value from the time series of estimated state-dependent use status values.

11. The validation system according to claim 10, further comprising:
training a neural network model with a training data set, the training data set including a plurality of training data samples, each training data sample including a learning input sample and a teacher output label;
wherein the learning input sample of each training data sample includes a time series of sample state-independent use status values and a sample state of the element;
wherein the teacher output label of each training data sample includes a time series of label state-dependent use status values; and
wherein the time series of label state-dependent use status values represents time steps that are immediately subsequent to time steps represented by the time series of sample state-independent use status values.

12. The validation system according to claim 11,
wherein the actual result value and the sample state-dependent use status values each include a total throughput of the communication service and a total number of users of the communication service; and
wherein the estimated state-dependent use status values and the label state-dependent use status values each represent an average throughput per user equipment (UE) in an area covered by the communication service.

13. The validation system according to claim 12,
wherein the changing comprises executing scale-out of the element; and
wherein the state of the element represents a scale of the element.

14. The validation system according to claim 13,
wherein the element is a user plane function (UPF);
wherein the scale of the element represents a quantity of UPFs; and
wherein the executing scale-out includes changing the quantity of the UPFs.

15. The validation system according to claim 14, wherein the determining is based on a comparison of the calculated index value and the actual result value.

16. The validation system according to claim 15, further comprising:
executing scale-in to revert the scale of the element in response to determining that the predetermined condition is satisfied.

17. A validation method, comprising:
changing a state of an element for providing a communication service;
calculating an index value indicating a state-dependent use status, the state-dependent use status representing a use status of the communication service that is dependent on the state of the element, the index value calculated in a status before the change of the state, at present, or at a future time, the calculation of the index value based on:
an actual result value of a state-independent use status, the state-independent use status representing a use status of the communication service that is independent of the state of the element, the actual result value at a timing after the change of the state; and
the state of the element before the change of the state; and
determining whether the calculated index value satisfies a predetermined condition.

* * * * *